No. 874,318.
PATENTED DEC. 17, 1907.
M. N. FLUGUM.
CORN EAR RACK.
APPLICATION FILED MAR. 4, 1907.
2 SHEETS—SHEET 1.
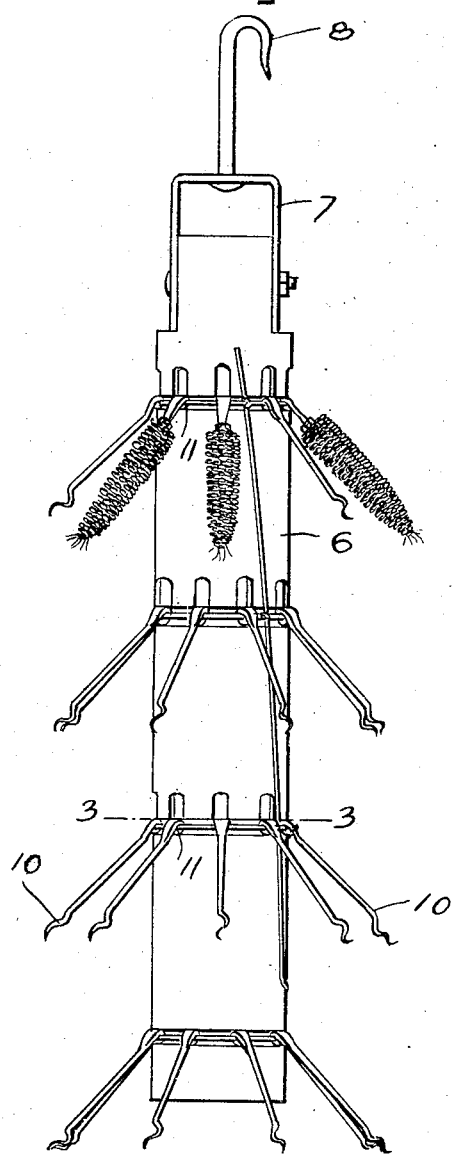
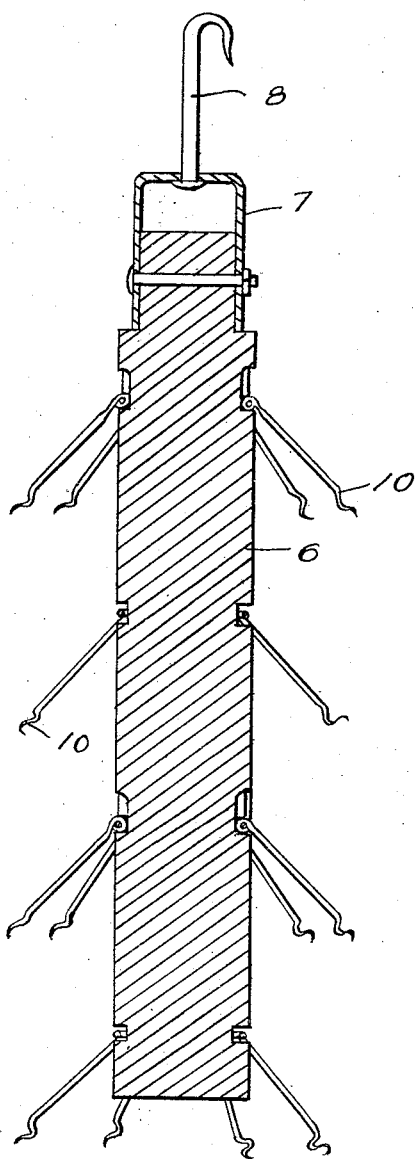

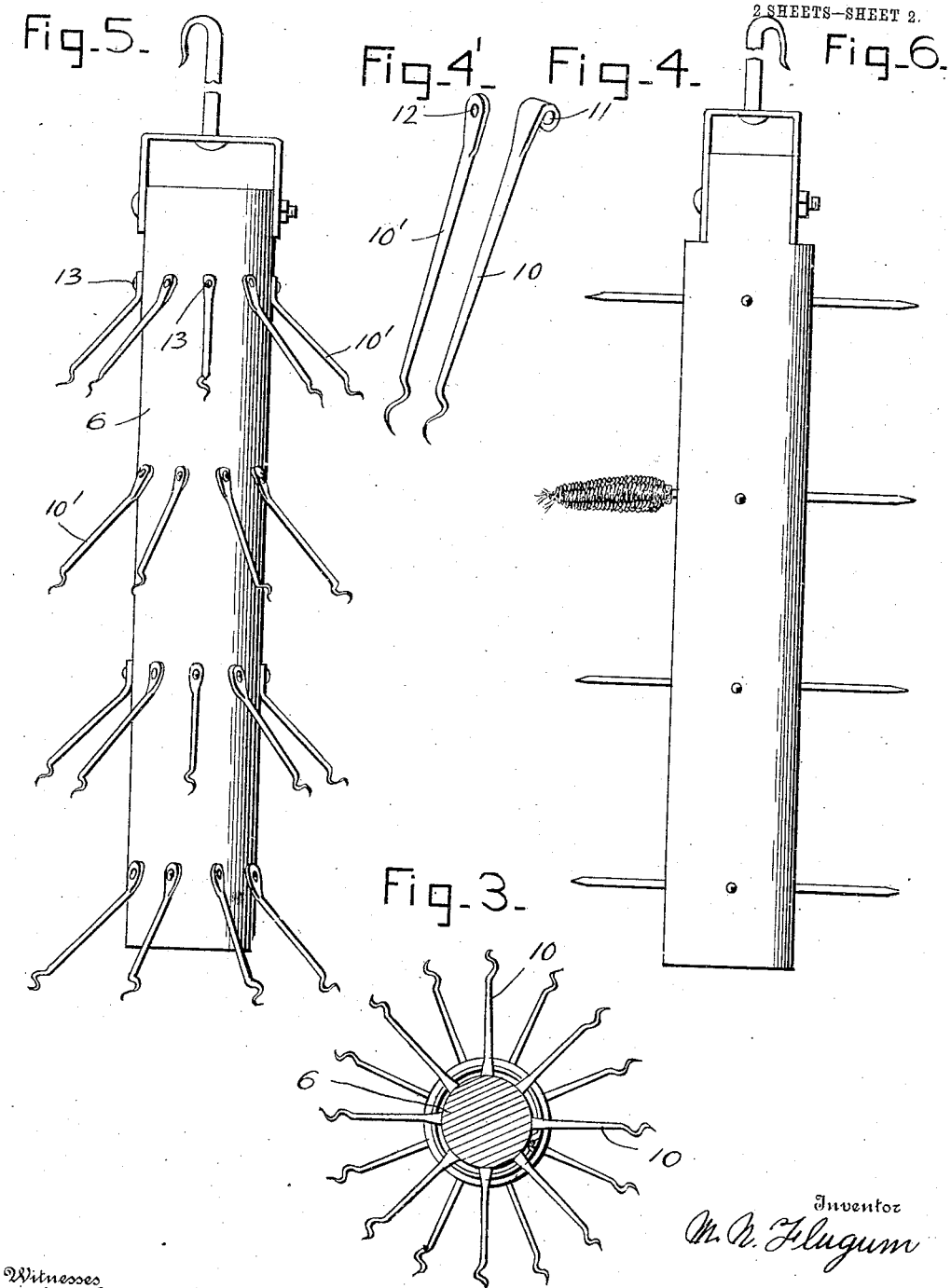

UNITED STATES PATENT OFFICE.

MONS N. FLUGUM, OF THOMPSON, IOWA.

CORN-EAR RACK.

No. 874,318.   Specification of Letters Patent.   Patented Dec. 17, 1907.

Application filed March 4, 1907. Serial No. 360,449.

*To all whom it may concern:*

Be it known that I, MONS N. FLUGUM, a citizen of the United States, residing at Thompson, in the county of Winnebago, State of Iowa, have invented certain new and useful Improvements in Corn-Ear Racks; and I do hereby declare the following to be a full, clear, and exact description of the invention, such as will enable others skilled in the art to which it appertains to make and use the same.

This invention has relation to devices for supporting ears of seed-corn for the purpose of drying and preserving the same.

Ears of corn suitable for seed are usually selected at husking time for the next season, and when they are husked the cob as well as the corn on it are soft, and it is desirable, in order to have good seed, that the ears should be dried evenly and thoroughly. It is therefore common to hang the ears up in some way to keep them separate or practically so. Oftentimes some of the husks are left on the cob and they are knotted or twisted together and are employed as a means for hanging the ear upon nails, pegs, or on a pole.

It is the purpose of my invention to provide a simple, convenient and efficient rack for the purpose explained that will save time and expense besides affording many advantages over the means and methods now usually employed.

The nature of the invention is fully and clearly ascertainable from the device portrayed in the annexed drawings, forming a part of this specification, in view of which it will first be described with respect to its construction and mode of use, and then be pointed out with particularity in the subjoined claims.

Of the said drawings—Figure 1 is a side view of the rack, showing several ears of corn connected with ear-holders. Fig. 2 is a longitudinal section. Fig. 3 is a transverse section taken in the plane 3 3, Fig. 1. Fig. 4 is an enlarged view in perspective of the form of suspending arm shown applied in Figs. 1, 2 and 3. Fig. 4' shows, in a similar manner, the form applied in Fig. 5. Fig. 5 is a side elevation of a modified form of the invention.

Similar numerals of reference designate similar parts or features, as the case may be, wherever they occur.

In the drawings, having reference particularly to Figs. 1 to 4, inclusive, 6 designates a round stick of wood or it might be a metal tube or rod, provided at its upper end with a clevis 7, in which a suspension hook 8 is swiveled.

Supposing the stick 6 to be of wood, I form therein annular grooves $g$ at suitably spaced intervals, for the reception of a suitable wire 9 to be laid therein.

10 designates ear-holders, one of which is shown on an enlarged scale in Fig. 4, which ear-holder may be made in cork screw or other suitable form at one end and provided with an eye 11, through which the wire 9 may be threaded so as to draw the eye into the grooves $g$, when said wire is tightened, and thus make the ear-holder 10 stand out at an obtuse angle to the stick.

As many grooves $g$ may be made in the stick as is desirable, and the wire 9 may be carried from one groove to another, by suitably twisting it together at proper points so that the wire in each groove shall form a ring to all intents and purposes.

The ear-holders 10 will be arranged preferably in staggered order on the stick, so that an ear on an upper holder may hang between two ears on holders next below. This order is not essential, but it is desirable to assist in keeping the ears separate.

It will be understood, of course, that the cork-screw end of the ear-holder will be secured in the end of the cob at the butt of the ear, and that after the rack is filled with ears it may be hung up on a pin or hook by means of the suspension hook 8, which by reason of its swiveled connection with the clevis 8, will permit the rack loaded with ears to be readily turned around when, for any purpose, it may be desired to do so.

When the part 6 of the rack is made of metal, as a hollow tube, as indicated in Fig. 5, it may have annular grooves formed in its sides and be otherwise employed, as just described, or ear holders 10' having flattened heads with eyes 12 formed transversely therethrough may be provided, and rivets 13 passed through the eyes and into holes in the tube to secure the ear-holders in place, as shown in Fig. 5.

It will be noted from the drawings that the free ends of the ear-supporting arms 10 are given barely an initial screw-threaded form, since all that is necessary in this respect is that the ears shall keep their position on the arms and not drop off therefrom by their own gravity. The matter of turning the sticks around from time to time to examine the ears and to pull off such as may be wanted, is a matter of consequence in the invention.

What is claimed is—

1. A rack for supporting ears of seed-corn consisting of a rod provided with swiveled supporting means at its upper end, and ear-supporting devices connected at their upper ends with the rack and extending outwardly at an obtuse angle, said ear supporting means having their terminals twisted into corkscrew-like form.

2. A seed-corn ear supporting rack consisting of a vertically supported and rotatable rod, provided with ear-supporting arms pivotally connected with the rod at their upper ends and extended outwardly at an obtuse angle, the terminals of the arms being adapted to engage the cob at the end of the ear and hold it in position.

3. A seed-corn ear supporting rack consisting of a vertically-supported rotatable rod having outwardly-extended ear-supporting arms adapted at their outer ends to be engaged with butts of ears of corn, pivotally connected at their inner ends with the rod, and constructed to engage and support ears of corn in separated position on their outer ends.

4. A seed-corn ear supporting rack consisting of a vertically-supported rod having outwardly - extended ear - supporting arms, pivotally connected at their inner ends with the rod, and having their outer ends made into cork-screw form to engage and support ears of corn in separated position.

In testimony whereof, I affix my signature, in presence of two witnesses.

MONS N. FLUGUM.

Witnesses:
MARTIN MONSON,
J. O. OSMUNDSON.